INVENTORS.
Paul H. Lee
Michael L. Skolnick
BY
Edward D. Murphy
ATTORNEY

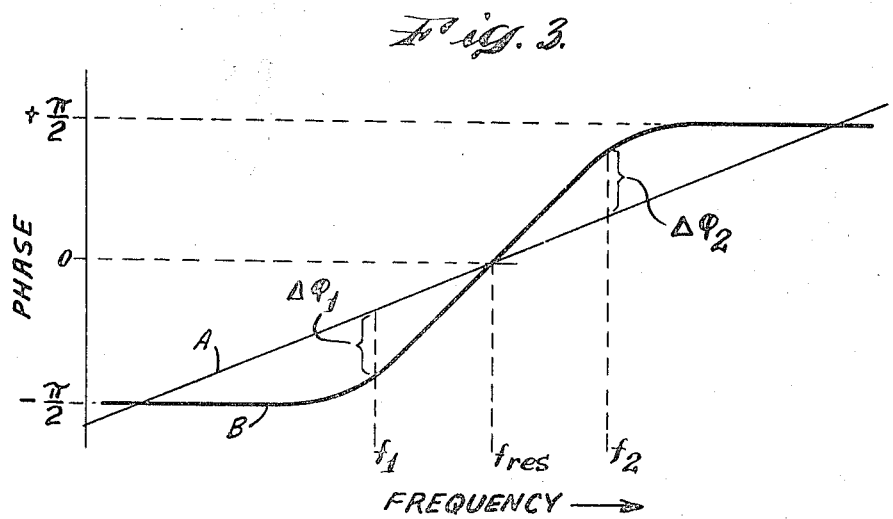
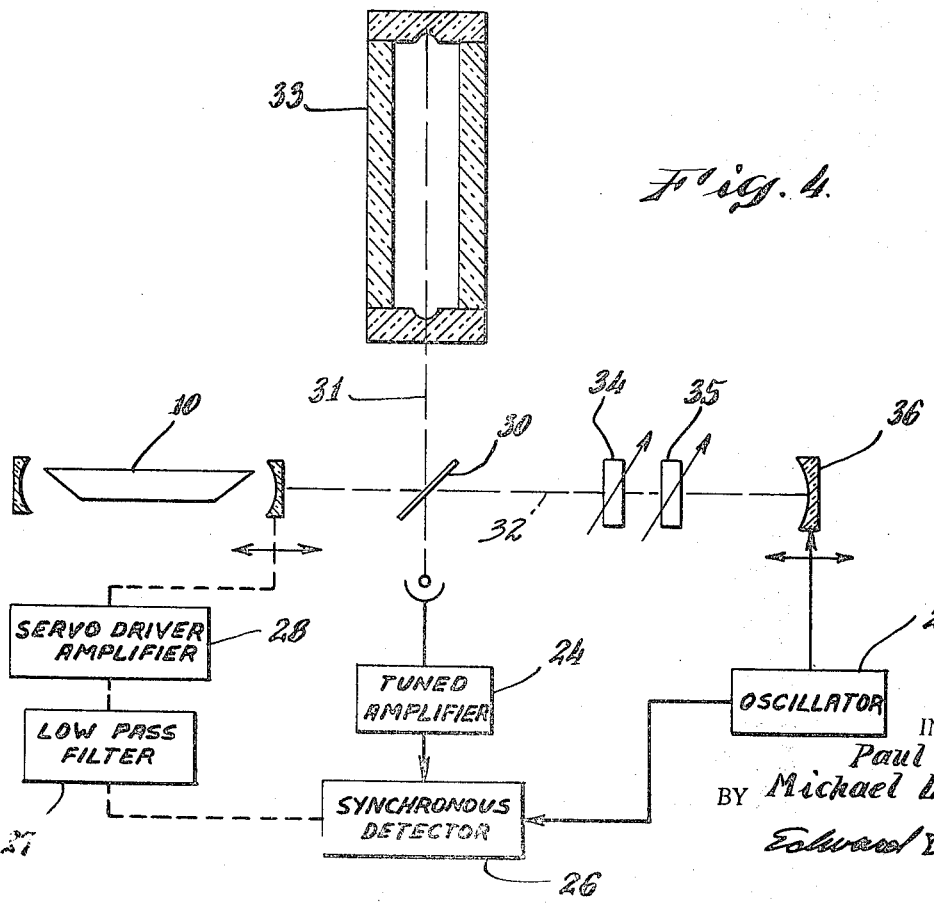

United States Patent Office 3,543,181
Patented Nov. 24, 1970

3,543,181
LASER FREQUENCY STABILIZATION SYSTEM
Paul H. Lee, Westport, and Michael L. Skolnick, Norwalk, Conn., assignors to The Perkin-Elmer Corporation, Norwalk, Conn., a corporation of New York
Filed Sept. 5, 1967, Ser. No. 665,534
Int. Cl. H01s 3/10
U.S. Cl. 331—94.5         5 Claims

ABSTRACT OF THE DISCLOSURE

A system for stabilizing a laser frequency at a selected value including means for comparing the phase of two divided portions of the beam, one of which is passed through a passive cavity which is resonant at the selected frequency while the other travels a nearly equal optical path. The phase of the second portion is biased so that the beams destructively interfere at a point of recombination when the laser is operating at the selected frequency. Any change of the laser frequency from the selected frequency is indicated by, and is proportional to, the intensity of light emitted from the point of recombination. The sign of any detuning of the laser is determined by modulating the phase of the second beam portion and comparing the phase of light emitted from the point of interference with that of the modulating signal. A corrective signal based on the light intensity and phase comparison is applied to correct the laser frequency.

---

This invention relates to an improved system for laser frequency stabilization which permits extremely precise regulation of the laser frequency at the desired value.

Frequency stabilization systems heretofore used in conjunction with lasers have included devices based on passing a portion of the beam through a resonant cavity and controlling the laser frequency in such a manner as to maintain the intensity transmitted by the cavity at a maximum, thus slaving the laser frequency to the resonant frequency of the cavity. Because this intensity must be measured at the relatively flat peak of the characteristic intensity curve of the cavity, this method is subject to several objections. Due to the breadth of the peak, small changes of the laser frequency from the cavity resonance frequency are very difficult to detect. Furthermore, if the laser drifts off frequency, it is not possible to determine the direction of the drift until a relatively large departure from the desired frequency has occurred. In attempting to solve these difficulties, previous methods have included the measure of periodically shifting the laser frequency in a known direction from the peak and returning it in order to determine the portion of the flat peak at which the laser is operating by comparing the curvature of the intensity variation with that of the intensity characteristic. However, this method involves periodically changing precisely that parameter which it is desired to stabilize, namely, the laser frequency; it is therefore highly undesirable. Another attempt to overcome this difficulty has involved the method of changing the length of the reference cavity in a similar manner in order to obtain the same information without shifting the laser frequency. However, this conflicts with a major requirement of the reference cavity, namely, that it be constructed to be of a permanently fixed length. When the mechanism for changing the cavity length is introduced, it becomes almost impossible to maintain the desired constant length at all other times. The present invention is directed to a system for laser frequency stabilization which provides precise, accurate regulation of the laser frequency without shifting either the laser frequency or the length of the passive reference cavity.

Accordingly, it is an object of this invention to provide a new and improved laser frequency stabilization system.

Another object of this invention is the provision of a new and improved system for comparing a laser frequency to that established by a reference cavity.

A further object of this invention is the provision of a novel laser frequency stabilization system wherein variations from the desired value can be quickly and easily detected.

It is also an object of this invention to provide a novel system for maintaining a laser output frequency within a very narrow bandwidth.

Briefly, in accord with one embodiment of this invention, we provide a frequency stabilization system for lasers which includes a passive reference cavity resonant at a selected frequency, means for passing a portion ot the laser beam through the reference cavity, means for comparing the phase of the beam from the reference cavity with that of another portion of the laser beam and means for controlling the laser frequency in accord with the result of the comparison. In accord with a particular embodiment, the means for phase comparison comprises means for producing destructive interference between the two beam portions when the laser frequency equals the resonant frequency of the cavity so that the intensity of light emitted from the point of interference is a measure of the error. Means are also provided for modulating the phase of the second portion of the beam so that the direction of frequency correction required can be determined.

The novel features believed characteristic of this invention are set forth in the appended claims. The invention itself, together with further objects and advantages thereof, may best be understood by reference to the following description taken in connection with the appended drawings in which:

FIG. 3 is a comparison of the variation of phase with frequency of beam portions traversing the respective paths shown in FIG. 1; and FIG. 4 is a schematic diagram of an alternative embodiment of this invention.

Figure 1:
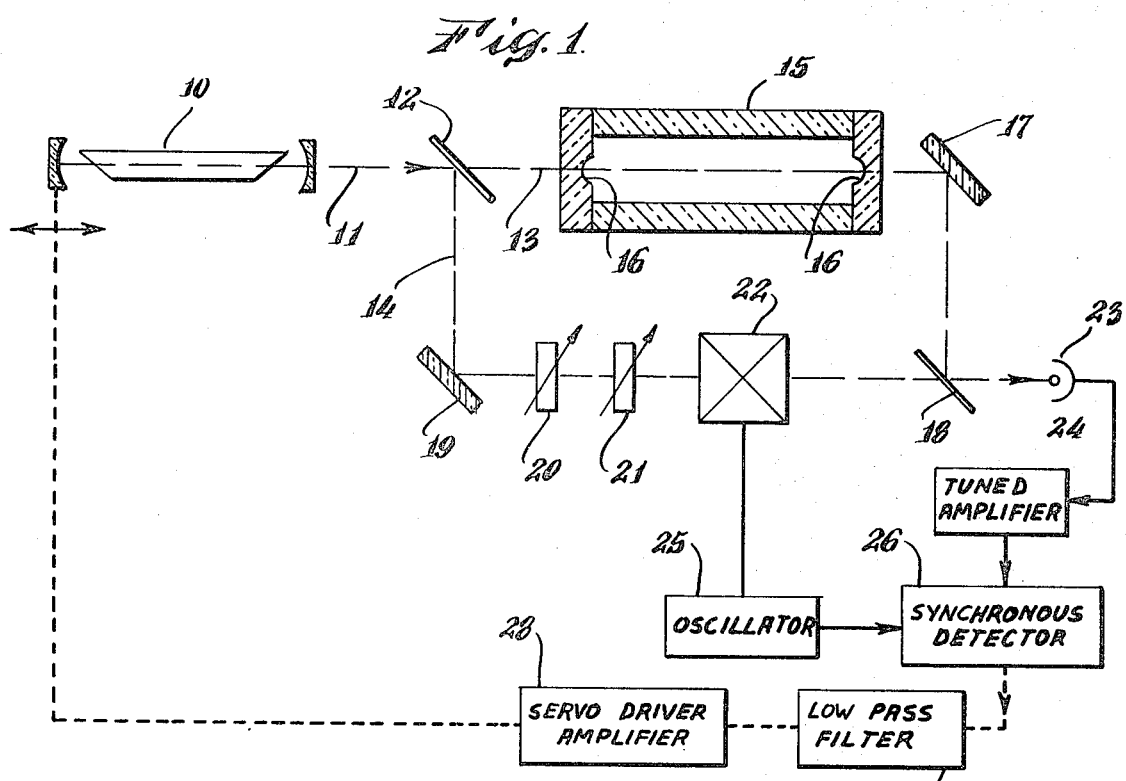
FIG. 1 is a schematic diagram of a frequency stabilization system in accord with a preferred embodiment of this invention.

In FIG. 1, a laser 10 is shown from which a part of its output, beam 11, is directed into a system in accord with this invention. A major portion of the laser output, not shown, is directed elsewhere for appropriate use. The laser may be any device operating on the laser principle which produces a beam of coherent electromagnetic radiation; for example, the helium-neon device described and claimed in U.S. Pat. 3,242,439, Rigden et al., may be used. For convenience, the terms "laser" and "light" will be used herein; however, this invention is not limited to visible radiation devices and obvious modifications may be made in the systems described to accommodate other wavelengths.

In accord with this invention, the beam 11 is divided into two portions, indicated by dotted lines 13 and 14, by a beam-splitter 12 which may comprise a half-silvered glass plate. The first beam portion, 13, is passed through a resonant cavity 15 comprising a pair of mirrors 61 separated by a fixed length so that the cavity is resonant at the desired operating frequency of the laser. The mirrors 16 are silvered sufficiently to reflect most of the beam within the cavity while transmitting a small proportion, for example, about 5%. For visible wavelengths, the cavity 15 may be a rigid hollow body of fused quartz filled with air, an inert gas, or vacuum. The beam portion 13 is then transmitted, by mirror 17, to a half-silvered glass plate 18 where it is recombined with the second beam portion. The second beam portion 14 is directed along a different path including a mirror 19, a transmission balance 20 for equalizing the intensities of the two beam portions, a phase biasing member 21 and a phase modulator 22 and then to the recombining plate 18.

Figure 2A:
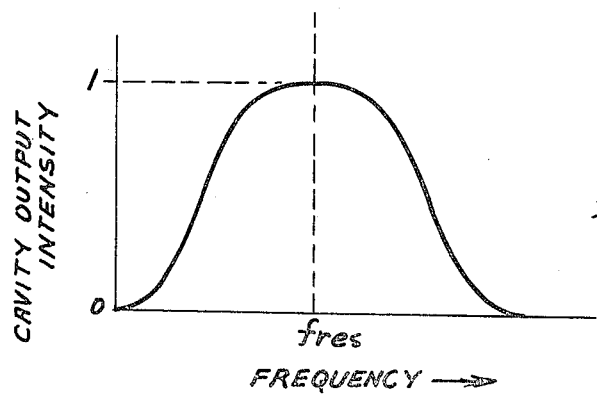
FIG. 2A and 2B are graphs respectively representing the characteristic intensity and phase variations with frequency of a resonant cavity.
Figure 2B:
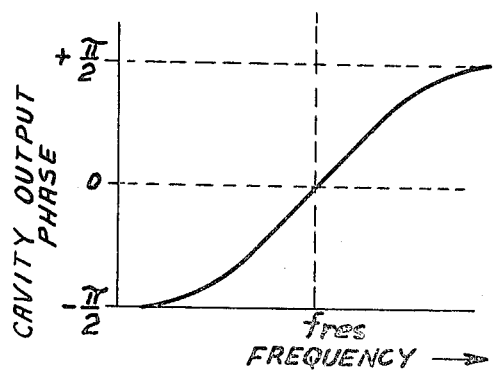

FIGS. 2A and 2B show, respectively, the characteristic variations of intensity and phase with frequency of a resonant cavity. Previous laser frequency stabilization systems have used the fact that the maximum emission from a resonant cavity is obtained when the input frequency matches the resonant frequency, $f_{res}$. However, as can be seen from FIG. 2A, the emission intensity at frequencies slightly different from the resonant frequency is almost identical to that at the resonant frequency and therefore, small shifts in the laser frequency are difficult to detect. Furthermore, even if the intensity change is detected, a relatively large excursion of the laser from the desired frequency is required before a meaningful estimate of the direction and magnitude of the error can be made.

The present invention is based on the realization that, as illustrated in FIG. 2B, the phase of the output from the resonant cavity also varies with frequency and in fact passes through a region of maximum variation as the frequency of the input is varied about the resonant frequency. Thus, the present invention is directed to a system for comparing the phase of the cavity output with the phase of another portion of the laser beam and adjusting the laser frequency to maintain them in a desired relationship. An advantage derived from this system is the fact that, if the laser frequency changes slightly, the output from the resonant cavity changes in phase by a large amount and thus the error is readily detected.

In the system shown in FIG. 1, the first beam portion 13 is directed through the resonant cavity so that its phase is determined in accord with FIG. 2B. Initially, the laser frequency is manually tuned to the resonant frequency of the cavity. Then, the transmission balance element 20, which may comprise a material having a selectable transmissivity such as a neutral density filter, is adjusted so that the intensity of the second beam portion is attenuated by an amount equal to any attenuation of the first beam portion. Next, the phase balance element 21, which may comprise a material having a variable optical path length such as a rotatable thin glass plate, is adjusted to match the phase of the two beam portions. In accord with a preferred technique, the phase of the second beam portion is adjusted so that the two beam portions are 180° out of phase. Then, when the beams are recombined, a black interference fringe is produced and a photocell 23, placed to receive the recombined beam, receives no light input when the laser frequency is tuned to the resonant frequency of the cavity.

When the operating frequency of the laser changes from that of the resonant cavity, a phase difference develops between the two beam portions. This is illustrated by FIG. 3 wherein curve A illustrates the variation of phase with frequency of the beam portion 13 while curve B illustrates the corresponding variation for beam portion 14. Since the phase of beam portion 13 changes rapidly about the resonant frequency, $f_{res}$, while that of beam portion 14 changes slowly in the same region, the phase difference develops and light appears at the point of recombination. Within the resonant bandwidth of the cavity, the intensity of light received by the photocell 23 is a measure of the magnitude of error between the laser frequency and the cavity resonant frequency. Thus, as illustrated in FIG. 3, if the laser frequency shifts to $f_1$ or $f_2$, a corresponding phase difference $\Delta\phi_1$ or $\Delta\phi_2$ develops, causing a corresponding light output.

In order to use this information to correct the laser, it is also necessary to determine the direction of the shift; that is, whether the laser frequency is greater than or less than the cavity resonant frequency. In the system of this invention, this is accomplished by modulating the phase of the second beam portion and comprising the resultant modulated light intensity at the photocell with the modulation signal applied to the second beam portion. Specifically, phase modulation of beam portion 14 causes a modulation of the light intensity sensed by the photocell at a frequency which depends on the phase modulation frequency. When the laser frequency equals the resonant frequency of the cavity, the light intensity is modulated at the second harmonic frequency, that is, twice the phase modulation frequency. If the laser frequency changes in either direction, the light intensity modulation changes to include a component at a frequency equal to the phase modulation frequency plus other components at higher frequencies harmonic to the phase modulation frequency. If the laser frequency has shifted to a value less than that of the cavity, the component of light intensity modulation at the frequency of the phase modulation is out of phase with the phase modulation signal; if the laser frequency has shifted to a value greater than that of the cavity, the component of light intensity modulation at the frequency of the phase modulation is in phase with the modulation signal. Thus, by providing a filtering means such as tuned amplifier 24 which only passes signals from a photocell which are at the same frequency as the phase modulation, the components at harmonic frequencies can be eliminated. The signal corresponding to the component at the phase modulation frequency is a measure of the difference between the laser frequency and the cavity resonant frequency, and is zero when the two are equal.

To accomplish this measurement, a phase modulation oscillator 25 is provided. The output thereof is applied to a phase modulator 22 comprising any suitable means such as a conventional electrooptic phase modulator and to a synchronous detector 26. The detector 26 compares the phases of the oscillator signal and of the output, if any, from the tuned amplifier and thus determines the direction of the shift of the laser frequency.

The synchronous detector also develops a frequency correction signal corresponding to the magnitude of the light intensity at the phase modulation frequency. The signal corresponding to the magnitude and direction of the required correction is separated from the carrier by means of a low pass filter 27 and then is applied to a servo driver amplifier 28 which corrects the laser frequency, for example by shifting one of the end mirrors of the laser in the required direction.

Thus, it can be seen that this invention provides a highly sensitive detection of error in the laser frequency and permits measurement thereof, both as to magnitude and direction, without requiring any variation of the parameters which should be left fixed, such as the laser frequency or the length of the reference cavity. The sensitivity is maximized by slaving the laser frequency to the center of a region of the cavity resonance where the phase shift has a maximum rate of change with respect to frequency thus permitting a large error signal to be developed as soon as the frequency shifts a small amount.

In FIG. 4, an alternative embodiment of this invention is shown which functions in a manner similar to that of FIG. 1 but embodies the additional advantages of increased stability and uses a reduced number of components. Specifically, this system comprises a beamsplitter 30 which functions to divide the laser beam into two portions 31 and 32 and also to recombine the two portions after the respective paths have been traversed. A first beam portion 31 passes through a resonant cavity 33 identical to that of FIG. 1 except that the end mirror is 100% reflective. The beam is reflected back to the beamsplitter 30 from the cavity. As in FIG. 1, the phase of the returning beam is determined by the relationship shown in FIG. 2B. The second beam portion 32 passes through intensity balance and phase bias elements 34 and 35 and is reflected along the same path by mirror 36. The elements 34 and 35 are similar to those of FIG. 1 except that, since each appears in the optical path twice, they are adjusted to perform half of their respective functions each time so that the beam as it returns to beamsplitter 30 is adjusted in intensity and phase to match the first beam portion 31 and produce a black interference fringe when the laser is operating at the proper frequency.

The remainder of the system is substantially identical to that shown in FIG. 1. The recombined beam is sensed by a photocell 23 and the resultant signal is passed through a tuned amplifier 24 to the synchronous detector 26. Phase modulation of the second beam portion is accomplished by connecting the oscillator 25 to means such as a piezoelectric transducer, not shown, which controls the position of mirror 36 so as to modulate the phase of the second beam portion. The amplifier is tuned to the same frequency as that of the oscillator. The synchronous detector derives the necessary information as to intensity and phase comparison, the filter 27 eliminates the carrier and the servo driver amplifier 28 positions one of the laser mirrors so as to reduce the intensity signal passed by the tuned amplifier to zero.

What is claimed is:

1. A system for stabilizing the emission frequency of a maser source of coherent radiation comprising:
    (a) means for dividing a beam of coherent radiation from a maser source into two portions;
    (b) resonant cavity means tuned to said emission frequency in the path of a first of said portions for controlling the phase of said portion in accord with the phase-frequency characteristic of said resonant means;
    (c) means for modulating the phase of said second beam portion;
    (d) means for recombining said first and second beam portions;
    (e) means for detecting radiation transmitted by said recombining means; and,
    (f) means for controlling the frequency of the maser source in accord with information contained in said transmitted radiation.

2. A system as claimed in claim 1 wherein said resonant means comprises a pair of rigidly spaced mirrors aligned with the optical path of said first beam portion, each of said mirrors being partially transmissive.

3. A system as claimed in claim 1 including means for establishing a selected relation at said recombining means between the phase of said first beam portion as controlled by said resonant means and the phase of said second beam portion, said means for establishing said selected relation comprising a phase bias element in the path of one of said beam portions adjustable to produce a destructive interference condition at said detection means when the frequency of said beam is equal to the resonant frequency of said resonant means.

4. A system as claimed in claim 1 wherein said means for controlling the frequency of the source comprises means for selecting only information at the frequency of said phase modulation of said second wave, and means for measuring the intensity of said information, means for comparing the phase of said information with the phase of said modulation; and means for adjusting the frequency of the source by an amount controlled by said intensity and in a direction controlled by said phase comparison.

5. A system as claimed in claim 1 wherein said means for dividing a beam and said means for recombining said first and second portions of said beam comprise a single, half-silvered mirror disposed at a 45° angle to the undivided beam and wherein said system further includes means for reflecting each of said beam portions back upon its own path.

References Cited

UNITED STATES PATENTS 3,445,787   5/1969   Hotz _____ 331—94.5

OTHER REFERENCES

Ballik, "Optical Maser Frequency Stabilization and Precise Wavelength Measurements," Phys. Lett. 4 (3), Apr. 1, 1963, pp. 173–6.

Targ, "Optical Heterodyne Detection of Micro-Modulated Light," Proc. EEE, 52, March 1964, pp. 303–4.

Polanyi et al., "Frequency Stabilization of a Gas Laser," 1 EEE J. Quant-Electr. QE–2, July 1966, pp. 178–9.

RONALD L. WIBERT, Primary Examiner

R. J. WEBSTER, Assistant Examiner

U.S. Cl. X.R.

250—199